(12) United States Patent
Hidaka et al.

(10) Patent No.: US 11,516,578 B1
(45) Date of Patent: Nov. 29, 2022

(54) PLATE MEMBER OF ACOUSTIC EQUIPMENT

(71) Applicant: DENSO TEN Limited, Kobe (JP)

(72) Inventors: Noboru Hidaka, Kobe (JP); Kayo Takamatsu, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 17/530,058

(22) Filed: Nov. 18, 2021

(30) Foreign Application Priority Data

May 21, 2021 (JP) .............................. JP2021-086063

(51) Int. Cl.
*H04R 1/28* (2006.01)
(52) U.S. Cl.
CPC .................................. *H04R 1/2888* (2013.01)
(58) Field of Classification Search
CPC ............................ H04R 1/1884; H04R 1/2888
See application file for complete search history.

(56) References Cited

FOREIGN PATENT DOCUMENTS

JP H06-314888 A 11/1994

*Primary Examiner* — Kile O Blair
(74) *Attorney, Agent, or Firm* — Oliff PLC

(57) ABSTRACT

A plate member of an acoustic equipment includes a flat plate that constitutes at least a part of the plate member that is used in the acoustic equipment. The flat plate includes a first drawn portion and a second drawn portion. The first drawn portion is recessed in a thickness direction of the flat plate with respect to a predetermined plane orthogonal to the thickness direction of the flat plate and has a rectangular outline when viewed in the thickness direction of the flat plate. The first drawn portion and the second drawn portion are arranged adjacent to each other so as to provide a predetermined gap therebetween. When a standing wave is formed on the flat plate, the first drawn portion and the second drawn portion are arranged so that the gap is located in a position of an antinode of the standing wave.

4 Claims, 3 Drawing Sheets

PLATE MEMBER OF ACOUSTIC EQUIPMENT

BACKGROUND OF THE INVENTION

Field of the Invention

The invention relates to a plate member of an acoustic equipment.

Description of the Background Art

In the acoustic equipment that handles an acoustic signal, such as an audio amplifier, an audio tuner, a video recording apparatus (recorder), a reproduction apparatus (player), and the like, when a vibration is transmitted to a circuit that handles the acoustic signal, elements, such as an electronic component that constitutes the circuit, a wiring material, and the like, are caused to be vibrated. As a result, contact resistances, induced voltages, and the like, in these elements change, whereby a noise may be applied to the acoustic signal and the acoustic signal may be distorted, which deteriorates sound quality.

Japanese Published Unexamined Patent Application No. 1994-314888 discloses an apparatus in which at least one vibration area surrounded by an annular rib is provided on a chassis, a harmful vibration generating component and at least one leg are mounted in the same vibration area and a vibration isolation target component is mounted outside the vibration area so as to reduce an influence of a vibration to the vibration isolation target component.

For example, as a main vibration source of the acoustic equipment, a power transformer, an electrolytic capacitor, a power transistor, and the like, included in the apparatus are exemplified. As a vibration received from an outside, a sound pressure of a sound output from a speaker, a vibration from a rotating device, and the like, are also exemplified. Such a vibration is designed to be reduced to a minute level. However, even such a minute vibration, for example, when a housing of the apparatus resonates with the vibration, the vibration may increase and affect the circuit that handles the acoustic signal. Thus, it is desirable that the apparatus is configured to suppress a resonance of the housing.

As a method of suppressing the resonance of the housing, it is thought that a number of components is reduced to reduce the resonance among the components. However, the number of the components cannot always be reduced, and thus there has been a problem that the case to which the method is applied is limited.

Furthermore, as a method of suppressing the resonance of the housing, it is thought that a thickness of the housing is increased to increase rigidity thereof. However, when the thickness of the housing is increased, a weight of the apparatus increases, and thus there has been a problem that the method is difficult to be applied to the apparatus for which weight reduction is required. Moreover, when the thickness of the housing is increased, material and manufacturing costs increase, and thus the method is not easily applied.

Therefore, by providing a drawn portion in a flat plate of the housing, it is though that the housing is partially reinforced without increasing the weight and material costs. However, even when the housing is partially reinforced, there has been a problem that the vibration of the other parts of the housing increases, and thus no fundamental solution has been reached.

SUMMARY OF THE INVENTION

According to one aspect of the invention, a plate member of an acoustic equipment includes a flat plate that constitutes at least a part of the plate member that is used in the acoustic equipment. The flat plate includes a first drawn portion and a second drawn portion. The first drawn portion is recessed in a thickness direction of the flat plate with respect to a predetermined plane orthogonal to the thickness direction of the flat plate. The first drawn portion has a rectangular outline when viewed in the thickness direction of the flat plate. The second drawn portion is recessed in the thickness direction of the flat plate with respect to the predetermined plane. The second drawn portion has a rectangular outline when viewed in the thickness direction of the flat plate. The first drawn portion and the second drawn portion are arranged adjacent to each other so as to provide a predetermined gap between the first drawn portion and the second drawn portion. When the flat plate is vibrated and a standing wave is formed on the flat plate, the first drawn portion and the second drawn portion are arranged so that the gap is located in a position of an antinode of the standing wave.

It is an object of the invention to provide a technology that effectively suppresses a vibration of a plate member that is used in an acoustic equipment.

These and other objects, features, aspects and advantages of the invention will become more apparent from the following detailed description of the invention when taken in conjunction with the accompanying drawings.

DESCRIPTION OF THE EMBODIMENTS

Figure 1:
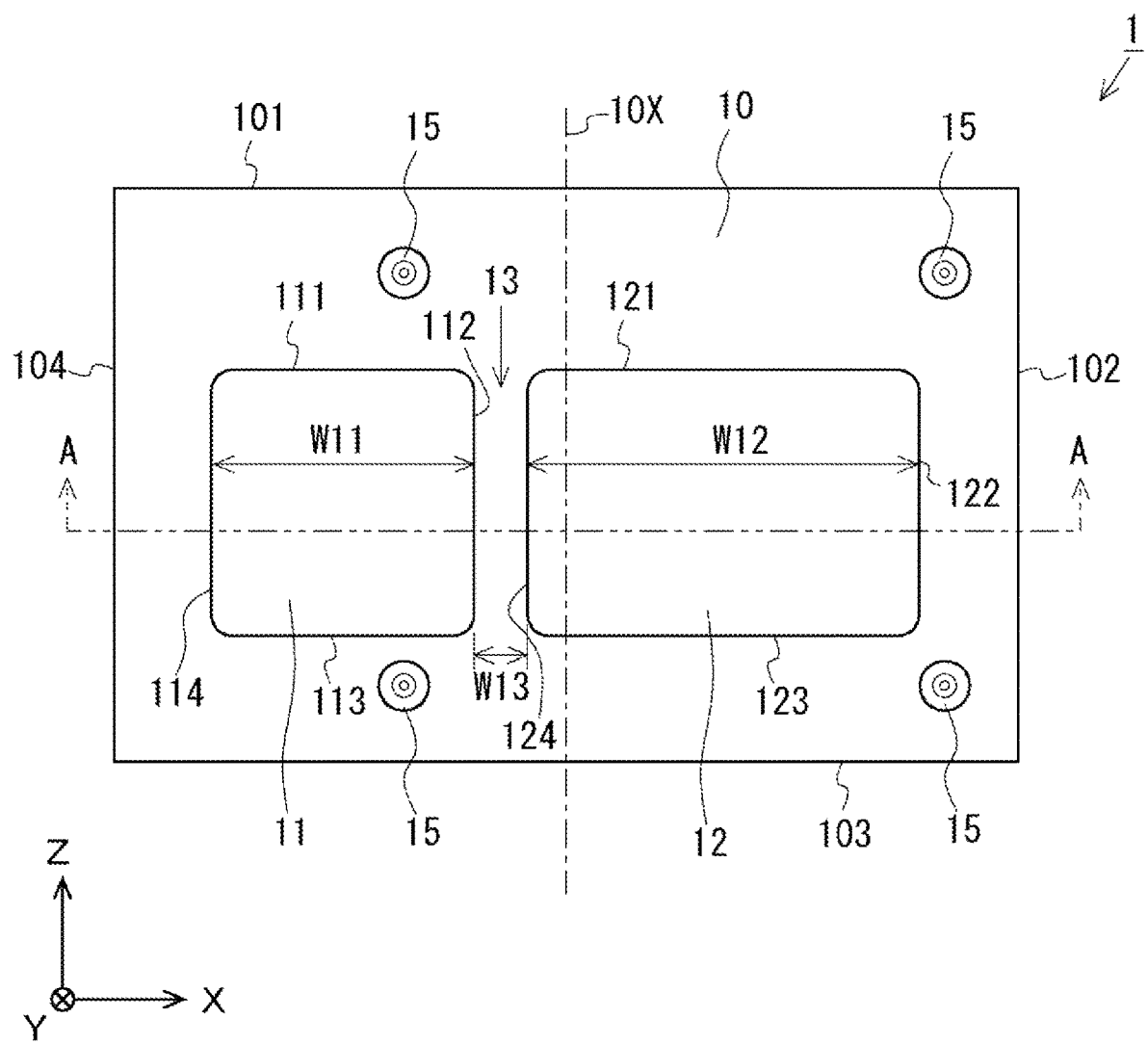
FIG. 1 is a plan view of a bottom plate to which a plate member according to an embodiment is applied.
Figure 2:
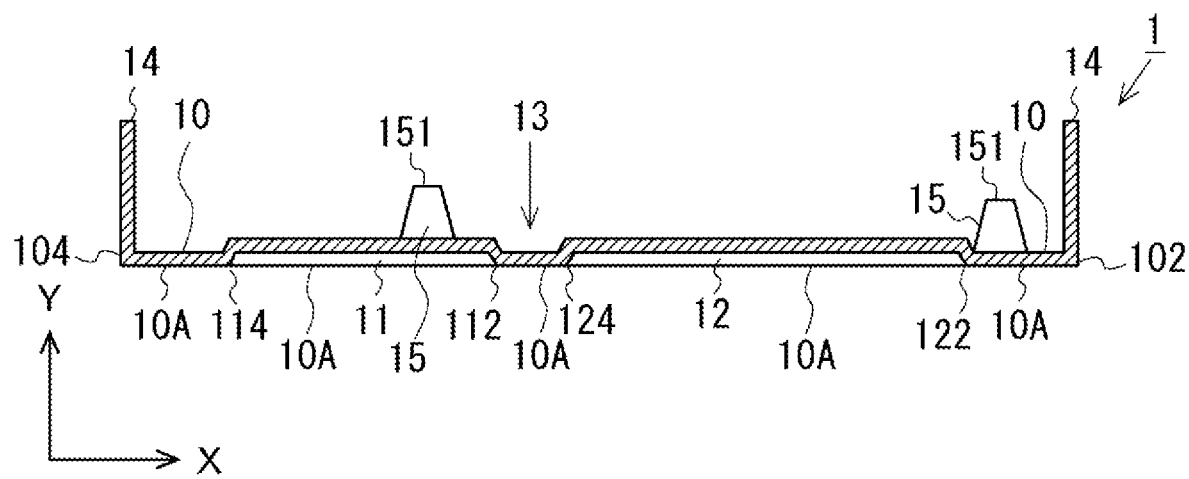
FIG. 2 is a cross-sectional view of FIG. 1 along the line A-A.
Figure 3:
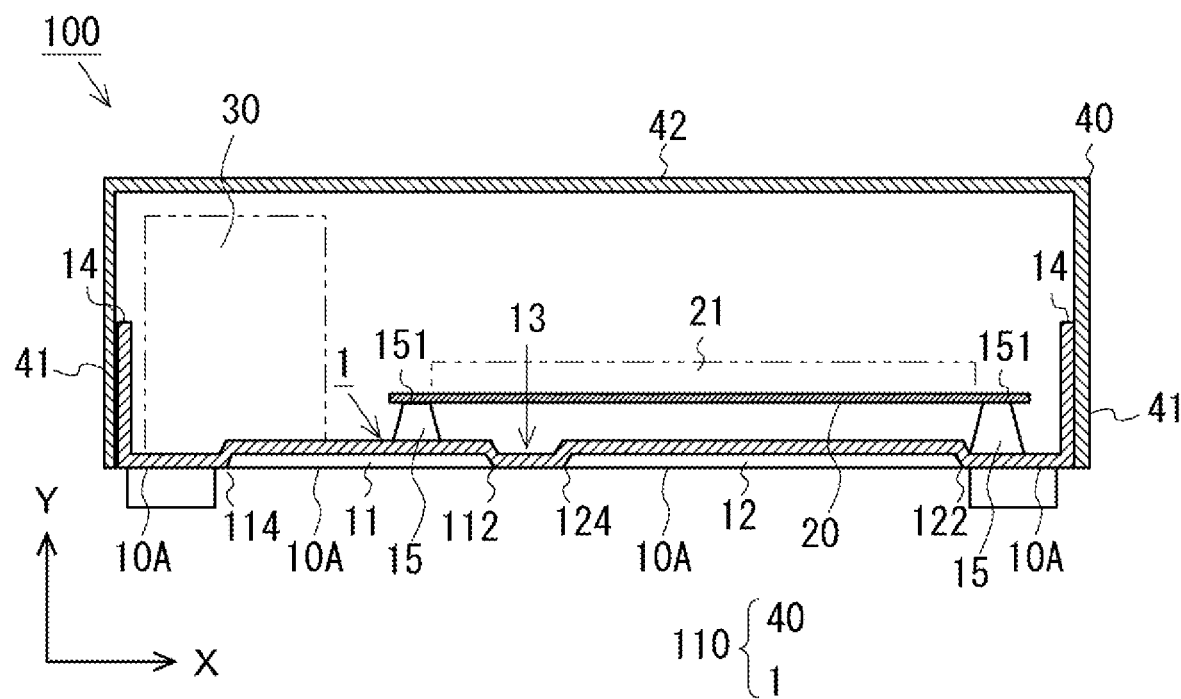
FIG. 3 is a schematically cross-sectional view of an audio amplifier including the plate member according to the embodiment.

A plate member according to an embodiment of the invention will be described below with reference to the drawings. FIG. 1 is a plan view of a bottom plate 1 to which the plate member according to this embodiment is applied. FIG. 2 is a cross-sectional view of FIG. 1 along the line A-A. FIG. 3 is a schematically cross-sectional view of an audio amplifier 100 including the plate member according to this embodiment. In FIG. 1 to FIG. 3, an X-axis shows a width direction, a Y-axis shows a height direction, and a Z-axis shows a front-rear direction. These directions are shown for convenience's sake, and they do not limit the directions in the plate member according to this embodiment.

The bottom plate 1 to which the plate member according to this embodiment is applied has a substantially flat shape. The bottom plate 1 constitutes a part (bottom portion) of a housing 110 in the audio amplifier 100.

The bottom plate 1 has a flat plate 10 that constitutes at least a part of the bottom plate 1 and is parallel to an X-Z plane (horizontal plane). The flat plate 10 has a first drawn portion 11 formed by drawing a part of the flat plate 10, and a second drawn portion 12 formed in the same manner as the first drawn portion 11. The bottom plate 1 according to this embodiment has a standing portion 14 formed by bending an end of the flat plate 10 in a left-right direction (X direction) upward and a substrate support 15 having a truncated cone shape formed by deep drawing a part of the flat plate 10 upward. The bottom plate 1 illustrated in each of FIG. 1 to FIG. 4 is merely one example and is not limited to this configuration. The bottom plate 1 may be configured to have the flat plate 10, and the first drawn portion 11 and the second drawn portion 12 provided at a part of the flat plate 10.

As illustrated in FIG. 3, a circuit board 20 is placed on an upper surface 151 of the substrate support 15 of the bottom plate 1, and the circuit board 20 is fastened to the substrate support 15 by a fastening member, such as a screw. The circuit board 20 is provided with a circuit 21 that performs signal processing, such as transmission, conversion, amplification, and output of an acoustic signal input from other equipment. The circuit 21 is one embodiment of a circuit that handles the acoustic signal.

Furthermore, on the bottom plate 1, a circuit 30 that becomes a vibration source, such as a power transformer, an electrolytic capacitor, or a switching element is provided.

An upper cover 40 is installed to the standing portion 14 of the bottom plate 1 by a fastening member, such as a screw. The upper cover 40 has left and right side plates 41 that constitute side surfaces of the housing 110 and a top plate 42 that constitutes an upper surface of the housing 110 and is connected to respective upper ends of the left and right side plates 41. In addition, the housing 110 has a rectangular parallelepiped shape that has a front panel (not shown) that constitutes a front surface and a rear panel (now shown) that constitutes a rear surface. As described above, the audio amplifier 100 according to this embodiment accommodates the circuit 21 that performs signal processing and the circuit 30 that becomes a vibration source in a space within the housing 110.

The first drawn portion 11 and the second drawn portion 12, as illustrated in FIG. 2, are dents (recessed portions) recessed in a thickness direction (Y direction) of the flat plate 10 with respect to a lower surface (a predetermined plane) 10A orthogonal to the thickness direction (Y direction) of the flat plate 10. As illustrated in FIG. 1, when viewed in the thickness direction of the flat plate 10, the lower surface 10A has a rectangular outline. Furthermore, the first drawn portion 11 and the second drawn portion 12 are arranged side by side in a predetermined direction (X direction) with a predetermined gap 13 between them.

Sides (outer edges) 111, 113 of the first drawn portion 11 opposed to each other in a Z direction and sides 121, 123 (outer edges) of the second drawn portion 12 opposed to each other in the Z direction are formed parallel to sides (edges) 101, 103 of the flat plate 10, respectively. Furthermore, sides (outer edges) 112, 114 of the first drawn portion 11 opposed to each other in the X direction and sides 122, 124 (outer edges) of the second drawn portion 12 opposed to each other in the X direction are formed parallel to sides (edges) 102, 104 of the flat plate 10, respectively. That is, the side 112 of the first drawn portion 11 on a side of the gap 13 and the side 124 of the second drawn portion 12 on the side of the gap 13 are formed parallel to each other.

As described above, the first drawn portion 11 and the second drawn portion 12 are arranged side by side in the X direction with the gap 13 between them and the gap 13 is arranged in a position deviated from a line (center line) 10X passing through a center of the flat plate 10 that is a center in the arrangement direction (X direction) in the Z direction. Furthermore, in this arrangement direction (X direction), a width W13 of the gap 13 is smaller than a width W11 of the first drawn portion 11 and is smaller than a width W12 of the second drawn portion 12. The width W11 of the first drawn portion 11 is formed so as to be different from the width W12 of the second drawn portion 12. That is, this relation is expressed by the following formulae, $$W13 < W11 \qquad \text{(formula 1)}$$

$$W13 < W12 \qquad \text{(formula 2)}$$

$$W11 \neq W12 \qquad \text{(formula 3)}$$

Effect

As described above, in the bottom plate 1 according to this embodiment, when the flat plate 10 is vibrated by a minute vibration generated from a vibration source, such as the circuit 30, during use of the audio amplifier 100 and a standing wave is formed on the flat plate 10, the first drawn portion 11 and the second drawn portion are arranged so that the gap 13 is located in a position of an antinode of the standing wave.

Figure 4:
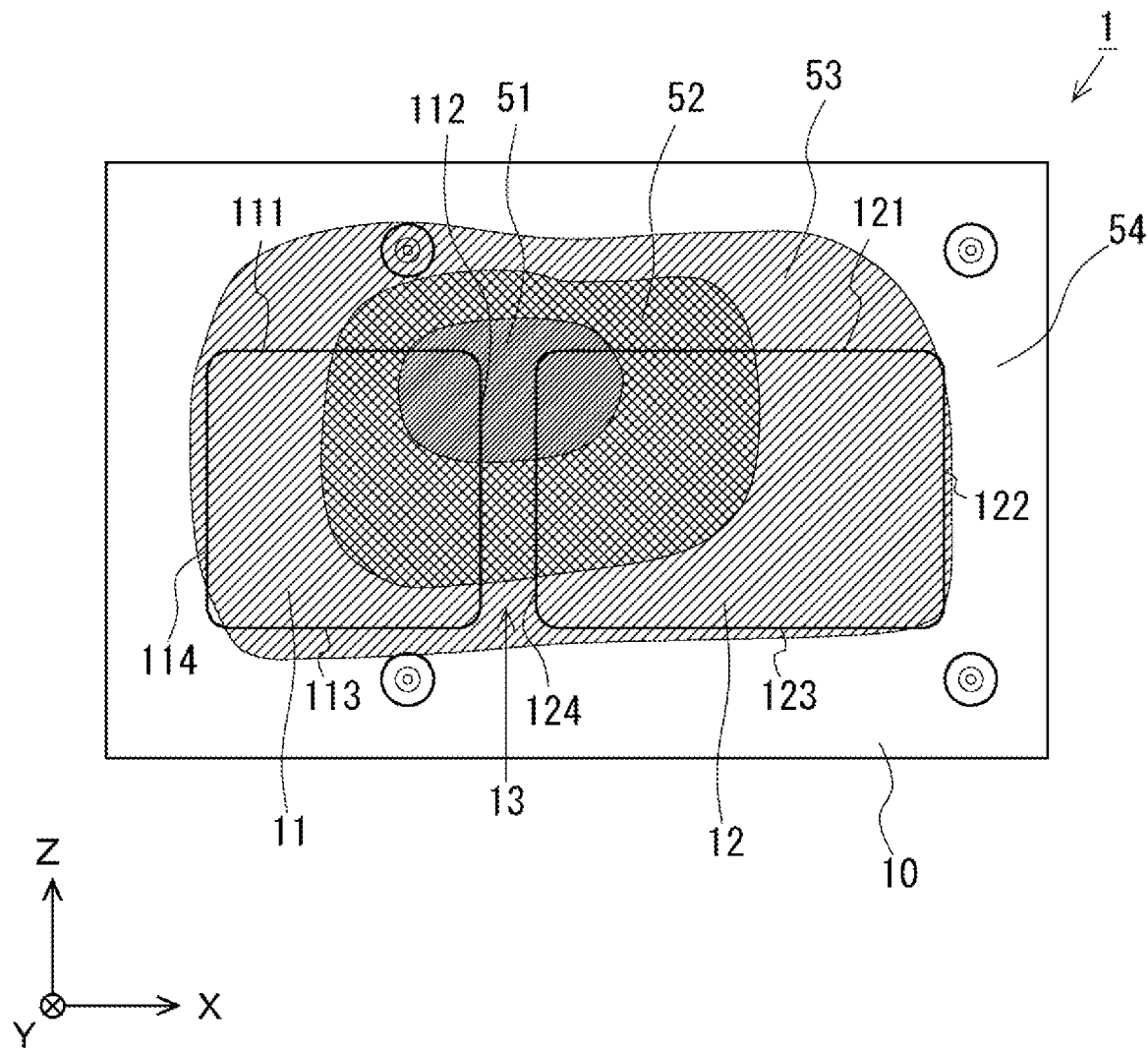
FIG. 4 illustrates a vibration state of the bottom plate detected by a vibration pickup and divided into a plurality of areas according to a vibration level.

FIG. 4 illustrates a vibration state of the bottom plate 1 detected by a vibration pickup and divided into a plurality of areas 51 to 54 according to a vibration level. In FIG. 4, the area 51 is an area in which the highest vibration occurs and corresponds to the antinode of the standing wave. The vibration gradually decreases from the area 51 to the area 54. The area 54 is an area in which the lowest vibration occurs. A vicinity of a boundary between the area 53 and area 54 corresponds to a node of the standing wave. In this embodiment, as illustrated in FIG. 4, the first drawn portion 11 and the second drawn portion 12 are arranged so that the gap 13 is located in the area 51. Particularly, in an example of FIG. 4, the first drawn portion 11 and the second drawn portion 12 are arranged so that each angle of the first drawn portion 11 and the second drawn portion 12 is positioned inside the area 51. Furthermore, the first drawn portion 11 and the second drawn portion 12 are arranged so that the sides 113, 114 of the first drawn portion 11 and the sides 122, 123 of the second drawn portion 12 follow the boundary between the area 53 and the area 54, that is, the node of the standing wave.

As described above, in this embodiment, the position of the antinode of the standing wave in which the vibration increases is reinforced by the side 112 of the first drawn portion 11 and the side 124 of the second drawn portion 12 so as to suppress the vibration and the vibration of other parts caused by reinforcing this part is suppressed by other sides 111, 113, 114, and 121 to 123. Thus, a resonance of the bottom plate 1 is effectively suppressed.

In this embodiment, the gap 13 is arranged in a position deviated from the center line 10X of the flat plate 10 in the X direction and the vibration state of the bottom plate 1 on a left side is different from that of the bottom plate 1 on a right side with the gap 13 as a boundary. Thus, the resonance of the bottom plate 1 is suppressed.

Furthermore, in this embodiment, in the X direction, the width W13 of the gap 13 is formed narrower than any of the width W11 of the first drawn portion 11 and the width W12 of the second drawn portion 12. As a result, a vibration state near the first drawn portion 11 is different from a vibration state near the second drawn portion 12 and thus the resonance of the bottom plate 1 is suppressed.

OTHERS

The embodiment described above shows an example in which the plate member is applied to the bottom plate of the audio amplifier 100. However, the invention is not limited thereto. The plate member may be applied to a side plate or a top plate. The plate member may be applied not only to the housing but also to plate members including a partition plate, a chassis provided inside the housing. Furthermore, the acoustic equipment to which the plate member is applied may be not only the audio amplifier 100 but also equipment including a circuit that handles an acoustic signal, such as an audio tuner, a video recording apparatus (recorder), and a reproduction apparatus (player).

While the invention has been shown and described in detail, the foregoing description is in all aspects illustrative and not restrictive. It is therefore understood that numerous other modifications and variations can be devised without departing from the scope of the invention.

What is claimed is:

1. A plate member of an acoustic equipment, the plate member comprising:
    a flat plate that constitutes at least a part of the plate member that is used in the acoustic equipment, the flat plate including:
    a first drawn portion that is recessed in a thickness direction of the flat plate with respect to a predetermined plane orthogonal to the thickness direction of the flat plate, the first drawn portion having a rectangular outline when viewed in the thickness direction of the flat plate, and
    a second drawn portion that is recessed in the thickness direction of the flat plate with respect to the predetermined plane, the second drawn portion having a rectangular outline when viewed in the thickness direction of the flat plate, wherein
    the first drawn portion and the second drawn portion are arranged adjacent to each other so as to provide a predetermined gap between the first drawn portion and the second drawn portion, and
    when the flat plate is vibrated and a standing wave is formed on the flat plate, the first drawn portion and the second drawn portion are arranged so that the gap is located in a position of an antinode of the standing wave.

2. The plate member according to claim 1, wherein
    the first drawn portion and the second drawn portion are arranged side by side in a predetermined direction with the gap between the first drawn portion and the second drawn portion, and the gap is arranged in a position deviated from a center line of the flat plate in the predetermined direction.

3. The plate member according to claim 1, wherein
    the first drawn portion and the second drawn portion are arranged side by side in a predetermined direction with the gap between the first drawn portion and the second drawn portion, and
    in the predetermined direction, a width of the gap is smaller than a width of the first drawn portion and is smaller than a width of the second drawn portion.

4. The plate member according to claim 3, wherein
    in the predetermined direction, the width of the first drawn portion is smaller than the width of the second drawn portion.

* * * * *